United States Patent
Segawa et al.

(10) Patent No.: US 7,525,689 B2
(45) Date of Patent: Apr. 28, 2009

(54) TRAPPING TECHNIQUE FOR AN IMAGE WHICH IS CONFIGURED BY ALLOCATING A PLURALITY OF FIGURES HAVING A RELATIVE UPPER AND LOWER POSITION ORDER

(75) Inventors: Hiroyuki Segawa, Kyoto (JP); Minoru Sawada, Kyoto (JP); Takuro Matsumura, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 951 days.

(21) Appl. No.: 10/973,259

(22) Filed: Oct. 27, 2004

(65) Prior Publication Data

US 2005/0219571 A1    Oct. 6, 2005

(30) Foreign Application Priority Data

Nov. 6, 2003    (JP)    ............................. 2003-376570

(51) Int. Cl.
*H04N 1/40* (2006.01)
*H04N 1/60* (2006.01)
*G06F 15/00* (2006.01)

(52) U.S. Cl. ...................................... 358/3.02; 358/1.9
(58) Field of Classification Search ................... 358/1.9, 358/1.18, 1.2, 1.3, 1.4, 1.6, 3.29, 2.1
See application file for complete search history.

(56) References Cited

U.S. PATENT DOCUMENTS

| | | | |
|---|---|---|---|
| 6,639,593 B1 * | 10/2003 | Yhann | 345/419 |
| 7,196,816 B2 * | 3/2007 | Watanabe | 358/1.9 |
| 7,256,910 B2 * | 8/2007 | Lee | 358/1.9 |

* cited by examiner

*Primary Examiner*—Douglas Q Tran
(74) *Attorney, Agent, or Firm*—McDermott Will & Emery LLP

(57) ABSTRACT

In trapping process of a multicolor image, an adjacent vector between an objective figure and a relative figure at an upper side is specified first. Then, with the use of the contour of the objective figure except for this adjacent vector, an adjacent vector between the objective figure and a lower relative figure is extracted. This enables to extract, as an adjacent vector, only the portion at which the color of the objective figure and the color of the lower related figure are adjacent each other in appearance. Therefore, the trapping process is executable without generating any unwanted color component on the image.

15 Claims, 12 Drawing Sheets

TRAPPING TECHNIQUE FOR AN IMAGE WHICH IS CONFIGURED BY ALLOCATING A PLURALITY OF FIGURES HAVING A RELATIVE UPPER AND LOWER POSITION ORDER

BACKGROUND OF THE INVENTION

1. Field of the Invention

The present invention relates to a trapping technique of allocating in an image, which is configured by allocating a plurality of figures having a relative upper and lower position order to their respective predetermined positions, a predetermined figure to a boundary portion at which two different colors contained respectively in the plurality of figures are adjacent each other.

2. Description of the Background Art

There has heretofore been known the technique of forming an image on a printing paper by multicolor printing with the use of a plurality of press plates, which correspond to a plurality of colors such as C (cyan), M (magenta), Y (yellow), and K (black), respectively.

In the image formed by such a multicolor printing, there is a boundary portion at which two different colors are adjacent each other. For example, in such an image that an M color figure and a K color figure are allocated as shown in FIG. 10A, there are boundary portions 201 and 202 (which are indicated by the thick lines in FIG. 10A). In cases where when this image is transferred from press plates to a printing paper, a drift occurs at the position of the press plates corresponding to respective colors, or expansion and contraction occur in the printing paper. Hence there may arise disadvantages that a gap is left at these boundary portions and the paper color of the printing paper peeps out and the like.

In order to avoid such a gap, "trapping process" has heretofore been performed in a prepress step. Trapping process includes allocating, along a boundary portion at which two colors are adjacent each other on an image, a narrow figure (hereinafter referred to as a "trap figure") composed of a color containing either or both color components of the two colors.

Recently, the editing process of images in the prepress step is often performed on a computer. A series of steps relating to trapping process are also implemented by executing a predetermined program on a computer.

In the editing process of images on a computer, in some cases, an image (page) printed by multicolor printing is handled as data that is configured by allocating a plurality of figures to predetermined positions. Between the plurality of figures, the order of relative upper and lower positions (the front and the rear on the page space) are designated. In cases where figures are allocated so as to overlap with each other, the figure to be displayed on the forefront is determined according to the order.

For example, the image as shown in FIG. 10A can be handled as data in which a K color annular shape 102 is allocated so as to overlap the upper side of an M color rectangle 101, as shown in perspective in FIG. 10B.

Trapping process of the image so configured is executed in units of figures constituting the image. A trap figure was allocated to all boundary portions existing between an objective figure of trapping process (hereinafter referred to as an "objective figure") and lower figures.

For example, in the image as shown in FIG. 10A, when the annular shape 102 is an objective figure, a trap figure containing either or both color components of the M color and the K color is allocated to both of the boundary portions 201 and 202 existing between the objective figure and the lower rectangle 101.

However, such a trapping process might generate a trap figure containing any unwanted color component when a figure is allocated to a further upper side from the objective figure.

This problem occurs, for example, as shown in perspective in FIG. 11B, in cases where a K color annular shape 102 is overlapped on the upper side of an M color rectangle 101, and on a further upper side thereof, a C color rectangle 103 is overlapped so as to contact with the inside edge of the annular shape 102, thereby configuring an image 100 as shown in FIG. 11A. If in the data of this image, the above-mentioned trapping process is executed with the annular shape 102 as an objective figure, a trap figure containing either or both color components of the M color and the K color is allocated to both of boundary portions 201 and 202 existing between the objective figure and the lower rectangle 101, as described above. Unfortunately, in the after-configuration image shown in FIG. 11A, the boundary portion 202 is the portion that must in appearance become a boundary between the K color and the C color. Therefore, the allocation of a trap figure containing the M color component results in an unnatural color allocation.

Especially, in such an image 300 as shown in FIG. 12, expressing a gradation of color density in such a manner that a plurality of figures 302 to 304, which are of the same color but different only in degree of color density, are adjacent each other on the upper side of a figure 301 of a color different from their respective colors, the allocation of a trap figure containing the color component of the figure 301 to boundary portions between the figures 302 to 304 results in a fatal defect in appearance.

SUMMARY OF THE INVENTION

The present invention is directed to a trapping method.

According to the present invention, a trapping method is a method for allocating in an image, which is configured by allocating a plurality of figures having a relative upper and lower position order, a boundary figure to a boundary portion at which two different colors contained respectively in the plurality of figures. The method includes: (a) the step of specifying, in a contour of an objective figure included in the plurality of figures, a first portion making contact with a figure allocated to an upper position than the objective figure; and (b) the step of extracting, as a skeleton of the boundary figure, a second portion making contact with a figure allocated to a lower position than the objective figure in the contour of the objective figure except for the first portion.

Even when a figure is allocated to the upper side of an objective figure, only the portion at which a plurality of colors are adjacent each other in appearance can be extracted as a skeleton of a boundary figure. This enables to allocate the boundary figure only to the portion at which a plurality of colors are adjacent each other in appearance. Therefore, trapping process is executable without generating any unwanted color component on an image.

The present invention is also directed to a trapping apparatus, a program, and a printing system.

Accordingly, it is an object of the present invention to provide a technique with which when an image is formed by multicolor printing, trapping process is executable without generating any unwanted color component, even if a figure is allocated to a further upper side than an objective figure.

These and other objective figures, features, aspects and advantages of the present invention will become more apparent from the following detailed description of the present invention when taken in conjunction with the accompanying drawings.

DESCRIPTION OF THE PREFERRED EMBODIMENTS

One preferred embodiment of the present invention will be described below with reference to the drawings.

Figure 1:
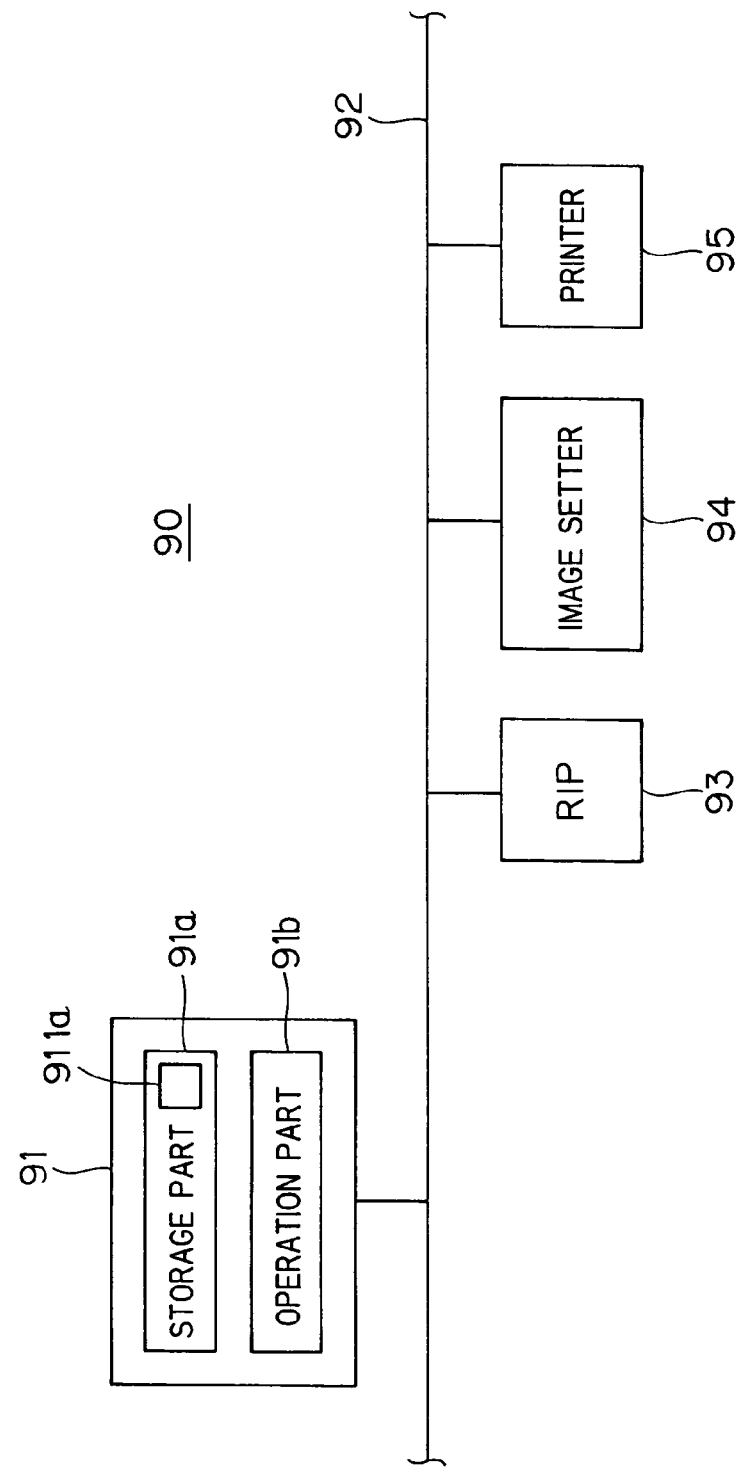
FIG. 1 is a diagram showing conceptually the configuration of a printing system.

The following steps of trapping process are executed under a program 911a on a general computer (trapping apparatus) 91, as shown conceptually in FIG. 1, which is provided with a storage part (a hard disk, a ROM, a RAM, etc.) 91a, and an operation part (CPU) 91b. Specifically, by referring to the program 911a installed in the storage part 91a and necessary data, the operation part 91b executes processing thereof. That is, in the following respective steps, the operation part 91b functions as a specifying part, an extracting part, a selecting part, a setting part, and a creating part of the present invention.

In addition, as shown in FIG. 1, the computer 91 is connected via a network 92 to a raster image processor (RIP) 93, and further electrically connected to an image outputting part including such as an image setter 94 and a printer 95. These configure a printing system 90 as a whole.

Figure 2:
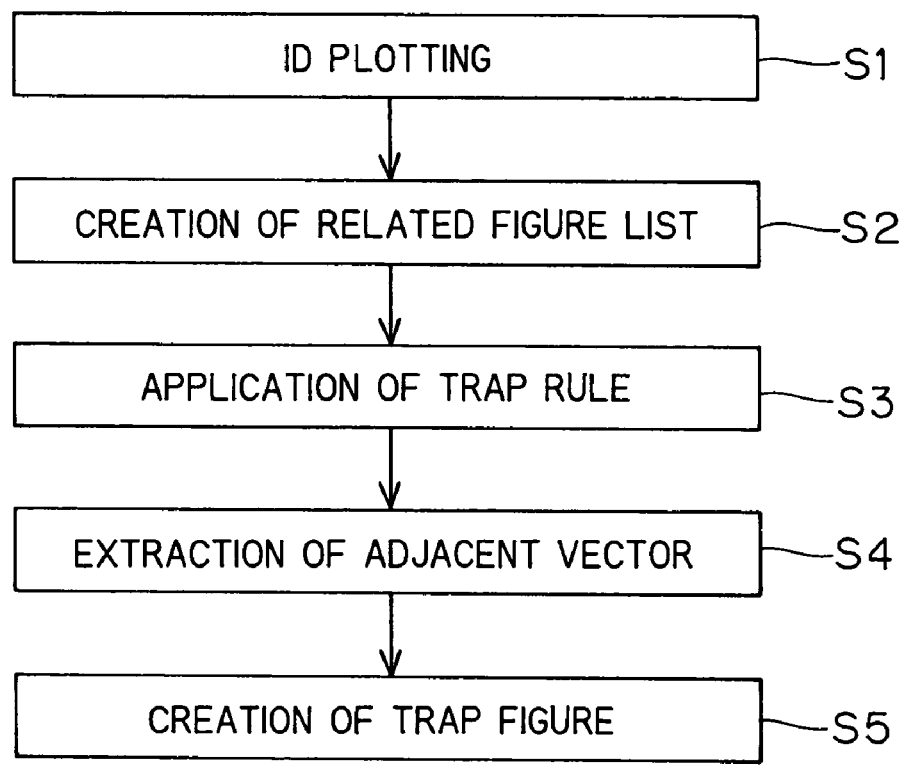
FIG. 2 is a flowchart showing the procedure of trapping process.

FIG. 2 is a flowchart showing the procedure of trapping process. This trapping process is a process that is executed in a prepress step of multicolor printing and includes mainly the following steps of: ID plotting (step S1), creation of a related figure list (step S2), application of a trap rule (step S3), extraction of an adjacent vector (step S4), and creation of a trap figure (step S5). These steps will now be described in sequence.

<1. ID Plotting>

In this preferred embodiment an image (page), which is taken as an object of multicolor printing, is a collection of a plurality of figures and configured by allocating the figures to predetermined positions, respectively. Each of the figures constituting the image is inputted to the computer 91, as data described in a format such as PostScript (PS) that is registered trademark of Adobe Systems Incorporated, and portable document format (PDF), and then converted to a format suitable for the program in the computer 91.

In step S1, an ID for identification is assigned to each of the figures constituting the image, and the IDs of these figures are displayed on the pixels at positions occupied by the corresponding figure on a bit map. The IDs are numerals for identifying the respective figures and also designating the relative upper and lower position order of the figures. For example, the numeral 1 is assigned to the image allocated to the lowermost position, and the numerals 2, 3, . . . are assigned to other images in the order of ascending order of position.

Figure 3A:
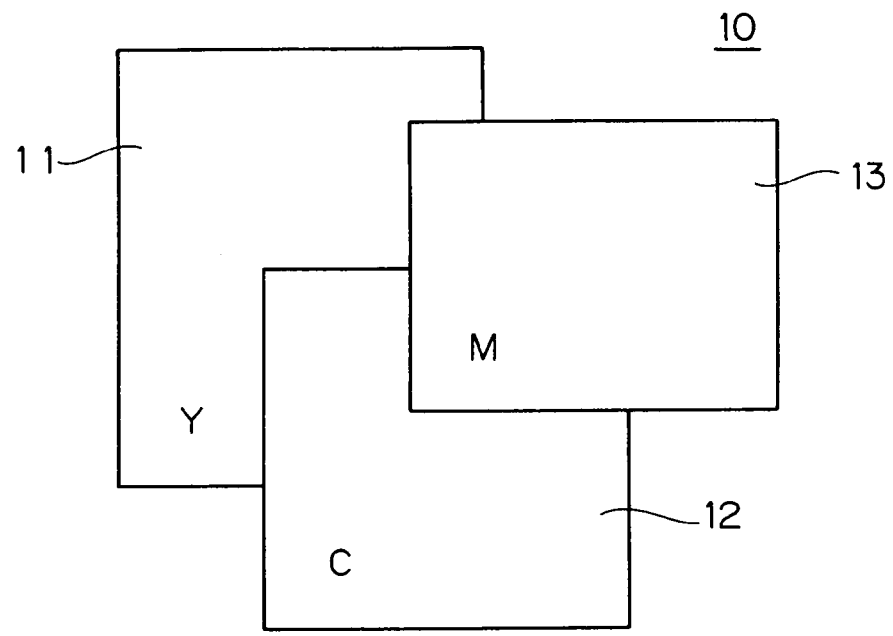
FIGS. 3A and 3B are diagrams showing one example of ID plotting.

As one example, consider the case where an image 10 as shown in FIG. 3A is taken as an object, in which three rectangles 11, 12 and 13 are allocated so as to have portions overlapping to each other. The relationship between the three rectangles 11, 12 and 13 is that the rectangle 11 is the lowermost and the rectangle 13 is the uppermost. Therefore, let the IDs of the rectangles 11, 12 and 13 be 1, 2, and 3, respectively.

Figure 3B:
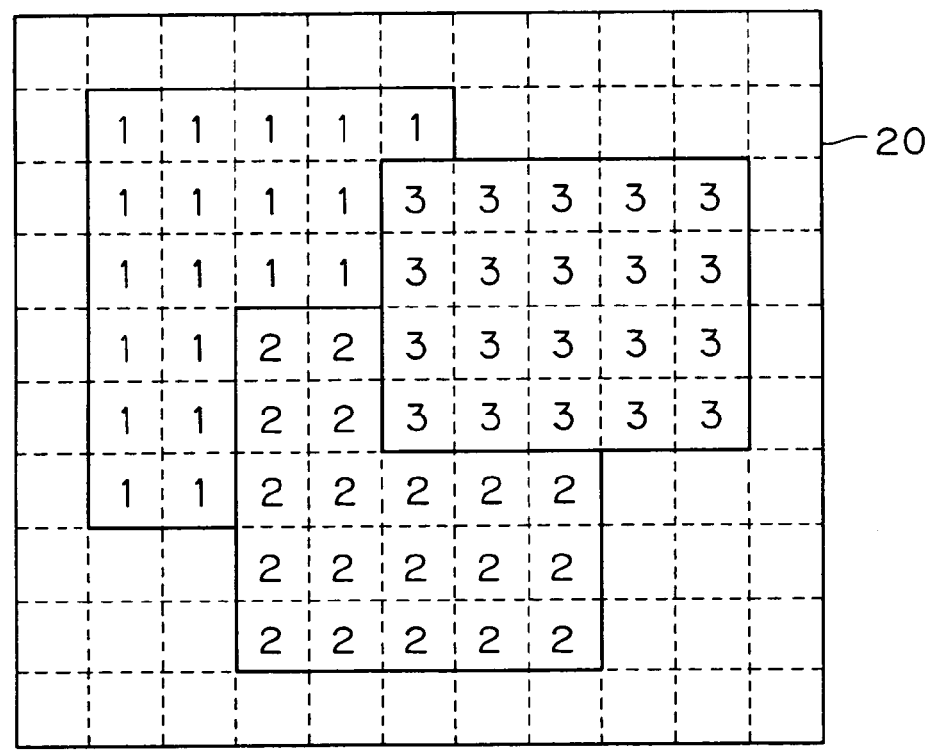

FIG. 3B shows the result of the ID plotting about the image 10 in step S1. As shown in FIG. 3B, the IDs of the respective figures are displayed at pixels that correspond to the positions occupied by each rectangle on a bit map 20. In other words, this is to display the FIGS. 11, 12 and 13 with the use of the IDs on the bit map 20. Here, the ID of a relatively upper figure is preferentially displayed on the pixels locating at the positions where a plurality of figures are overlapped with each other. This enables to arrange and display the IDs in the allocation corresponding to the appearance of the image 10.

<2. Creation of Related Figure List>

Trapping process includes allocating a trap figure to a boundary portion existing between an objective figure and a lower figure thereof. Therefore, in figures lower than the objective figure, a figure with which the contour of the objective figure makes contact, namely, a figure that is lower than the objective figure and has an overlap with the objective figure or makes contact with the objective figure, becomes the figure relating to the trapping process about the objective figure (hereinafter referred to as a "lower related figure").

In step S2, a lower related figure is selected when each figure is taken as an objective figure, and they are stored as a lower related figure list. In addition, in the trapping process of this preferred embodiment, figures that are upper than an objective figure and have a boundary portion with the objective figure (hereinafter referred to as an "upper related figure") are also selected and stored as an upper related figure list.

Figures registered in the lower related figure list and the upper related figure list are selected with the use of a bit map obtained by the ID plotting in step S1, employing the following method. First, the after-ID-plotting bit map is scanned vertically and laterally to read the ID displayed on each pixel. Next, if there is a pixel that is adjacent to a pixel corresponding to an objective figure, and the displayed ID is different from the ID of the objective figure, a figure containing this pixel is selected and registered in the lower related figure list when the ID of the selected figure is smaller than the ID of the objective figure, and the upper related figure list when it is greater. Then, this registration process is executed to the cases where respective figures constituting the image are taken as an objective figure.

Figure 4:
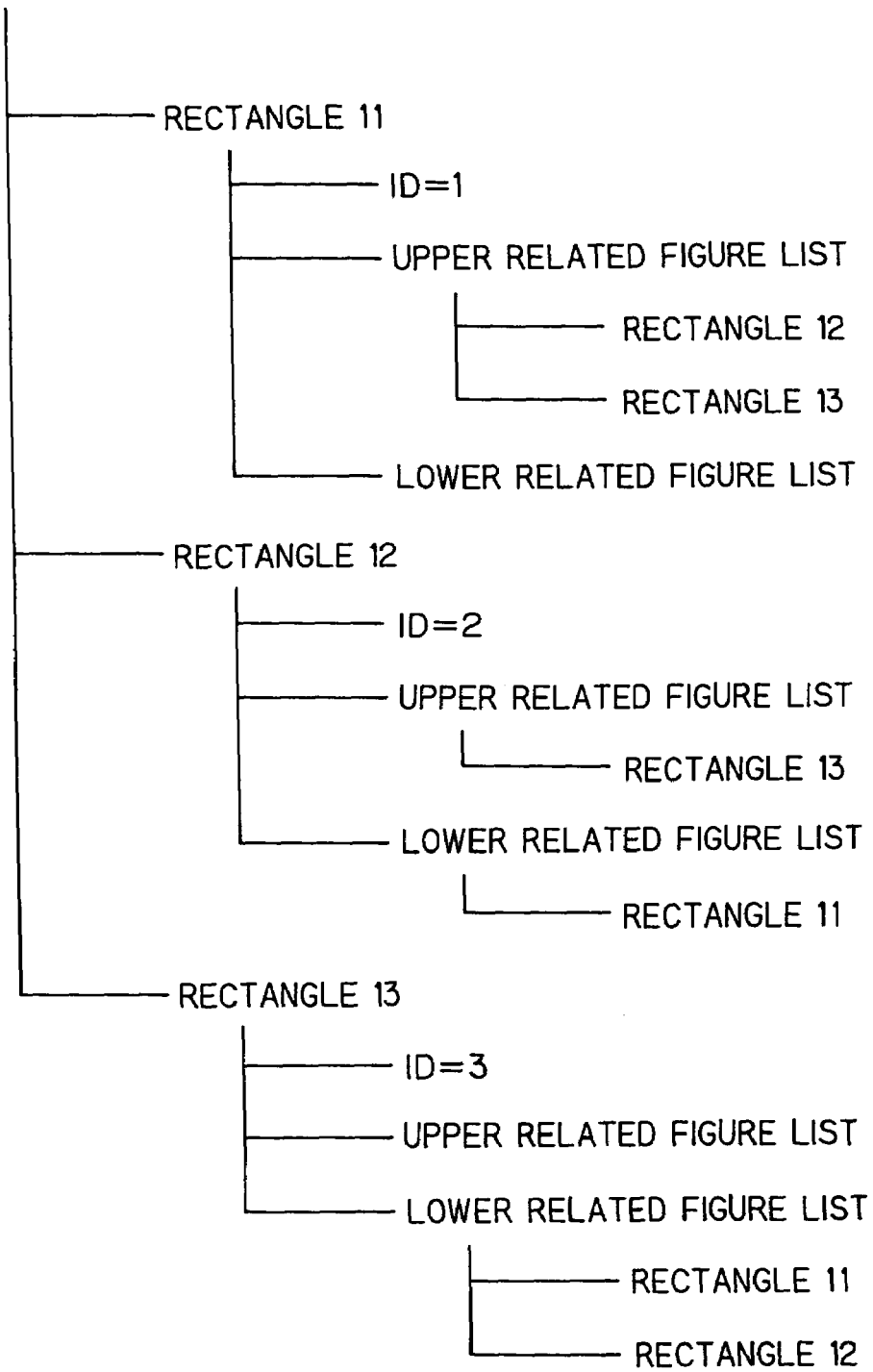
FIG. 4 is a diagram showing one example of the results of creating a lower related figure list and an upper related figure list.
Figure 11A:
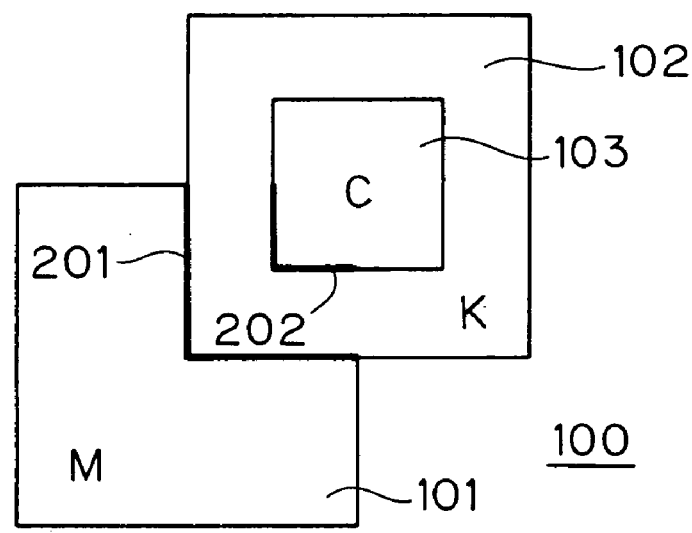
FIGS. 11A and 11B are diagrams showing one example of images in which a figure is allocated to a further upper side than an objective figure.
Figure 11B:
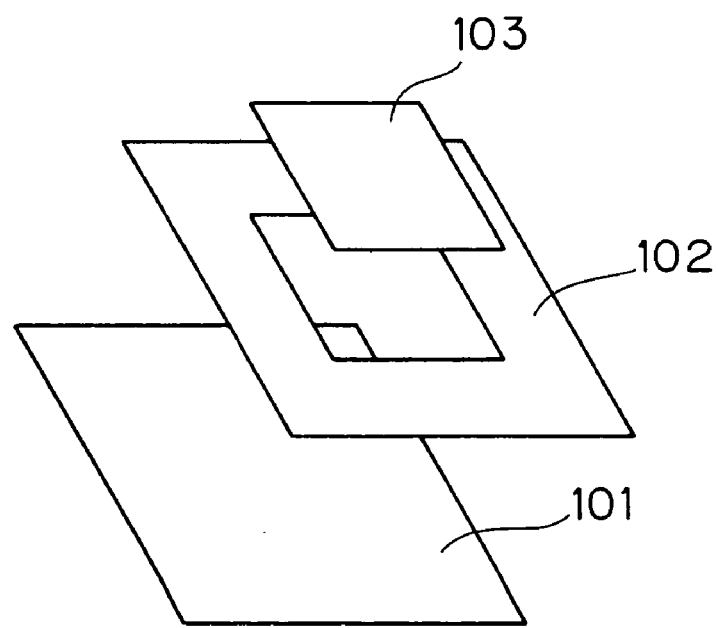
Figure 12:
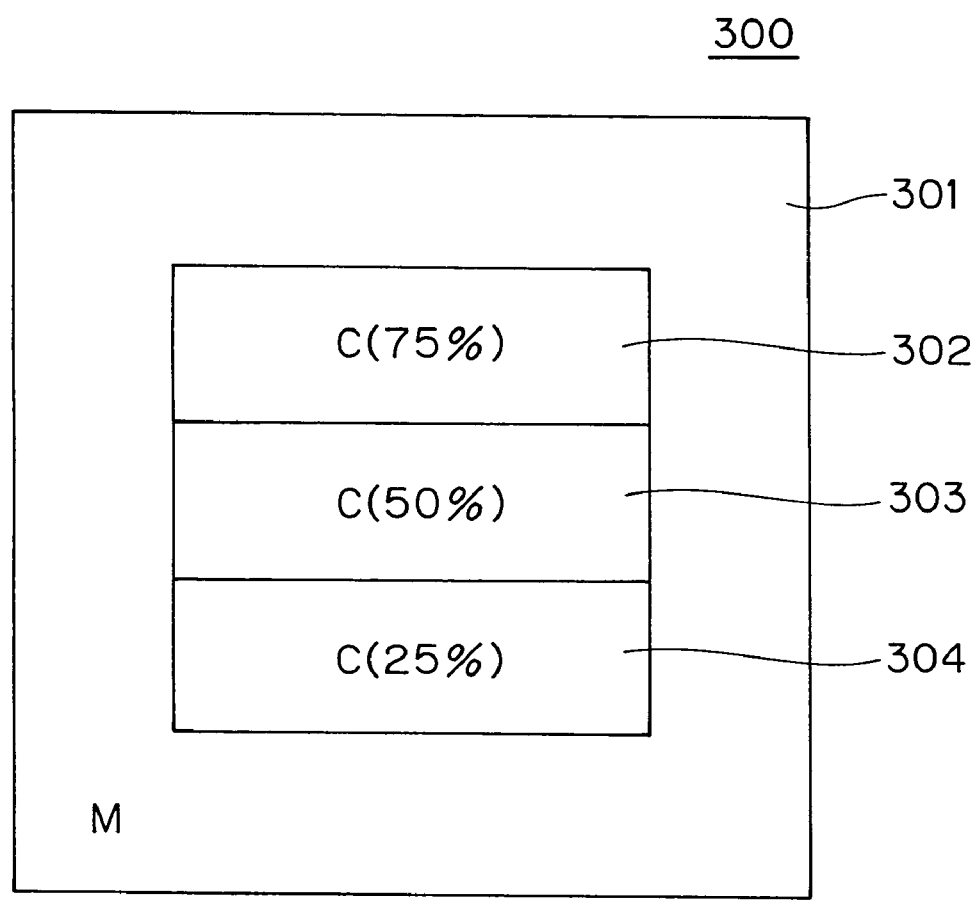
FIG. 12 is a diagram showing one example of images in which a plurality of figures that are of the same color but different only in degree of color density are allocated adjacent each other to an upper side of a figure of a color different from their respective colors.

FIG. 4 shows the result of creation of a lower related figure list and an upper related figure list when the FIGS. 11, 12 and 13 are taken as an objective figure, in the image 10 of FIG. 3A. In this case, the bit map 20 of FIG. 3B is scanned to select the figures registered in these related figure lists. As a result, the rectangles 12 and 13 are registered in the upper related figure list of the rectangle 11, and no figure is registered in the lower related figure list. The rectangle 13 is registered in the upper related figure list of the rectangle 12, and the rectangle 11 is registered in the lower related figure list. No figure is registered in the upper related figure list of the rectangle 13, and the rectangles 11 and 12 are registered in the lower related figure list.

Figure 5:
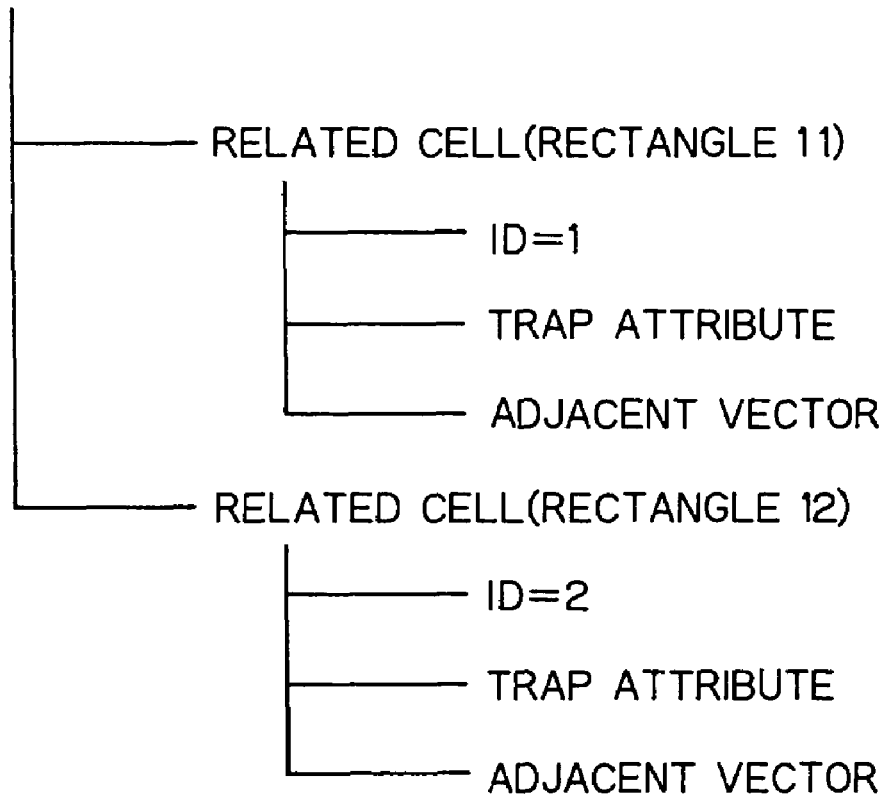
FIG. 5 is a diagram showing one example of configurations of related cell.

Here, the upper related figure list and the lower related figure list are stored in the storage part of the computer, as one hierarchy of page data, which has such a tree structure as schematically shown in FIG. 4, and then stored in an under layer of the respective figure data. The figures registered in the lower related figure list and the upper related figure list are also stored in the storage part 91a of the computer 91, as a structure (hereinafter referred to as a "related cell"), which contains information such as the ID thereof, and a trap attribute and an adjacent vector to be described later. FIG. 5 shows, as one example of this, the configuration of related cells about the lower related figure of the rectangle 13.

<3. Application of Trap Rule>

Step S3 is to set the attribute of a trap figure (hereinafter referred to as a "trap attribute"), which should be allocated to a boundary portion between an objective figure and the lower related figures registered in step S2. The term "trap attribute" indicates, for example, the direction of allocation, the color, and the width of a trap figure, which are respectively set according to a predetermined rule (hereinafter referred to as a "trap rule").

For example, the direction of allocation of a trap figure, that is, as to whether the trap figure is allocated along the side of an objective figure in a boundary portion, or along the side of a lower related figure, or along both sides, is set on the basis of the color of the objective figure and the lower related figure. In order to overshadow the trap figure, the direction of allocation is usually set to the side of one having a lower luminance value (brightness) in the objective figure and the lower related figure.

The color of the trap figure is also set on the basis of the color and the like of an objective figure and the lower related figure which sandwich the trap figure, and it is usually set to a color that is obtained by synthesizing the maximum values of press plates of both figures. The width of the trap figure is set, on the basis of the size of an objective figure and the like, to a width suitable for the size. The trap rule is a collection of such various rules for setting a trap attribute.

In step S3, a trap attribute is set by applying this trap rule between an objective figure and all the lower related figures thereof. This setting process is executed to the case where all the figures constituting the image are taken as an objective figure. As a result, for example, as shown in FIG. 5, trap attributes are stored in the related cell that relates to each lower related figure. The trap attribute stored here is referred to when creating a trap figure in step S5 described later.

<4. Extraction of Adjacent Vector>

Step S4 is to extract a zigzagged line or a segment (hereinafter referred to as an "adjacent vector"), which becomes a skeleton of a trap figure to be allocated to a boundary portion between an objective figure and a lower related figure registered in step S2. The adjacent vector can be extracted as a portion of the contour of the objective figure, which contacts (circumscribes or intersects) a lower related figure.

As a specific procedure of extracting process, an intersection between the contour of an objective figure and the contour of a lower related figure is found first. Then, a portion extending inwardly from the intersection in the contour of the objective figure is extracted, and this portion is defined as an adjacent vector. When the contour of the objective figure and the contour of the lower related figure make contact with each other, the entire of the portion of the contour of the objective figure, which makes contact with the contour of the lower related figure, is defined as an adjacent vector.

Figure 6A:
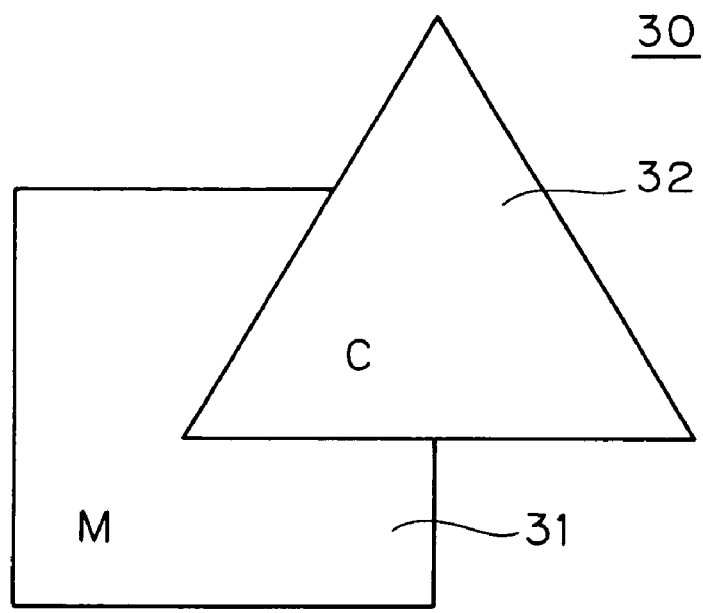
FIGS. 6A and 6B are diagrams showing one example of extracting an adjacent vector.
Figure 6B:
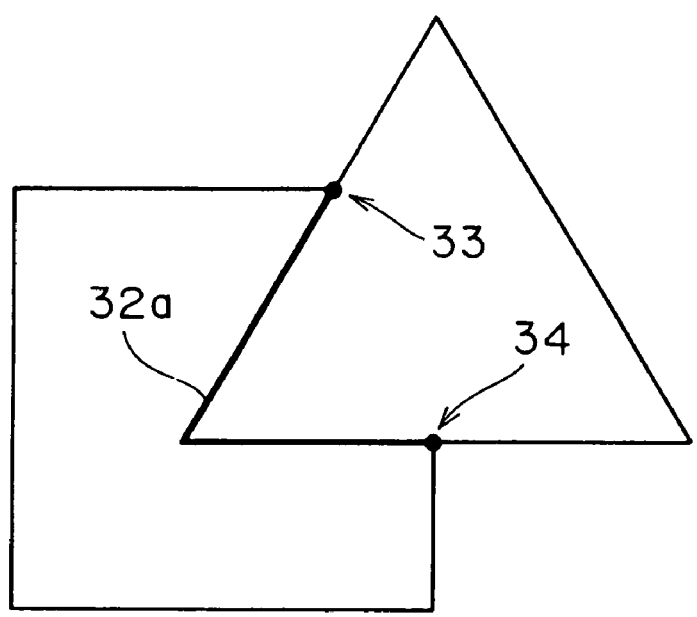

One example of extracting an adjacent vector in an image 30 shown in FIG. 6A will now be described. The image 30 is an image configured by allocating a C color triangle 32 so as to overlap the upper side of an M color rectangle 31. Therefore, when the triangle 32 is taken as an objective figure, the rectangle 31 becomes the lower related figure thereof. When obtaining an adjacent vector therebetween, as shown in FIG. 6B, intersections 33 and 34 between the contour of the triangle 32 and the contour of the rectangle 31 are found first. Then, a portion (indicated by the thick line in FIG. 6B) 32a in the contour of the rectangle 32, which extends inwardly from these intersections 33 and 34 in the contour of the rectangle 31, is extracted and defined as an adjacent vector.

When a plurality of lower related figures are present with respect to one objective figure, an adjacent vector between the objective figure and a lower related figure allocated to a relatively upper position is extracted first and other lower related figures follow in descending order of position. Then, when obtaining an adjacent vector with a lower related figure allocated to a relatively lower position, extracting process is performed with the use of the contour of the objective figure except for the portion already extracted as an adjacent vector.

Figure 7A:
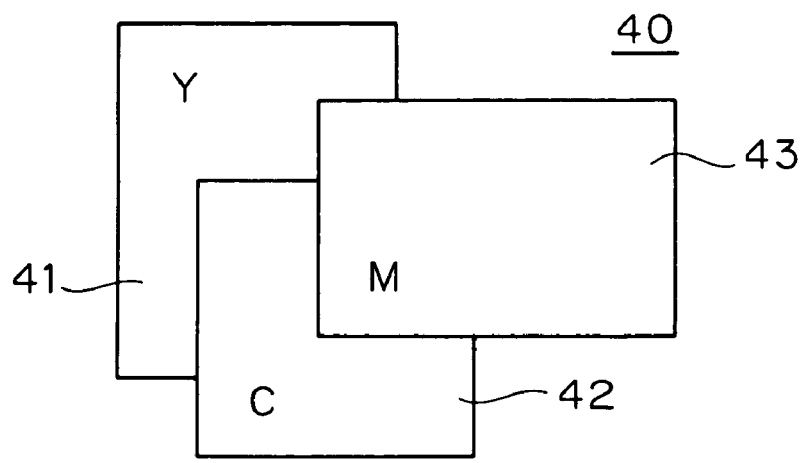
FIGS. 7A, 7B, and 7C are diagrams showing one example of extracting an adjacent vector when a plurality of lower related figures are present with respect to one objective figure.
Figure 7B:
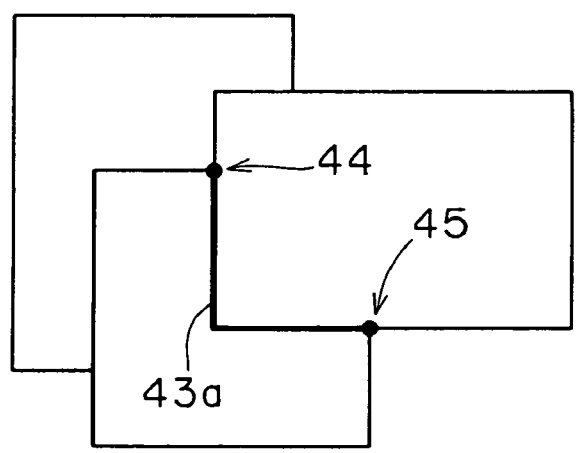
Figure 7C:
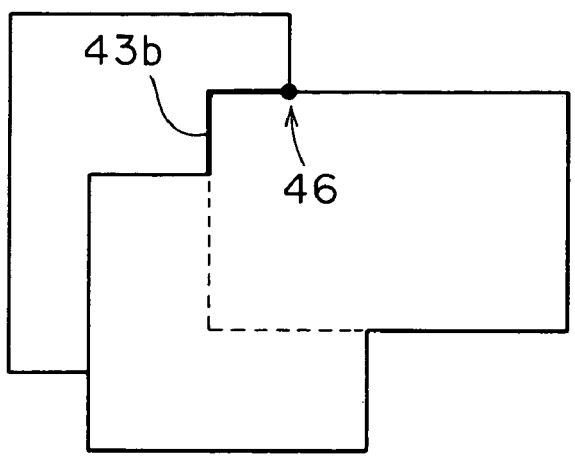

For example, when a rectangle 43 is an objective figure in an image 40 as shown in FIG. 7A, there are two lower related figures thereof, rectangles 41 and 42. In this case, an adjacent vector between the objective figure and the rectangle 42 allocated to a relatively upper position is extracted fast. Here, a portion (indicated by the thick line in FIG. 7B) 43a in the contour of the rectangle 43, which extends inwardly from intersections 44 and 45 in the contour of the rectangle 43, is extracted and defined as an adjacent vector with the rectangle 42. Then, when obtaining an adjacent vector with the rectangle 41 allocated to a relatively lower position, extracting process is performed with the use of the contour of the rectangle 43 except for the portion 43a. That is, a portion (indicated by the thick line in FIG. 7C) 43b, which is the contour of the rectangle 43 except for the portion 43a, and extends inwardly from an intersection 46 in the contour of the rectangle 41, is extracted and defined as the adjacent vector with the rectangle 41.

This enables to extract, as an adjacent vector, only the portion at which the color of an objective figure and the color of a lower related figure are adjacent each other in appearance, even when there are a plurality of lower related figures. Therefore, a trap figure to be created in step S5 can be created so as to have a suitable color allocation in appearance.

In cases where an upper related figure is present with respect to an objective figure, in consideration of the upper related figure, an adjacent vector is extracted as follows. In the same manner as in the above-mentioned extraction of adjacent vectors, an adjacent vector between the objective figure and the upper related figure is specified first. Then, an adjacent vector with a lower related figure is extracted with the use of the contour of the objective figure except for the portion specified as the adjacent vector with the upper related figure.

Figure 8A:
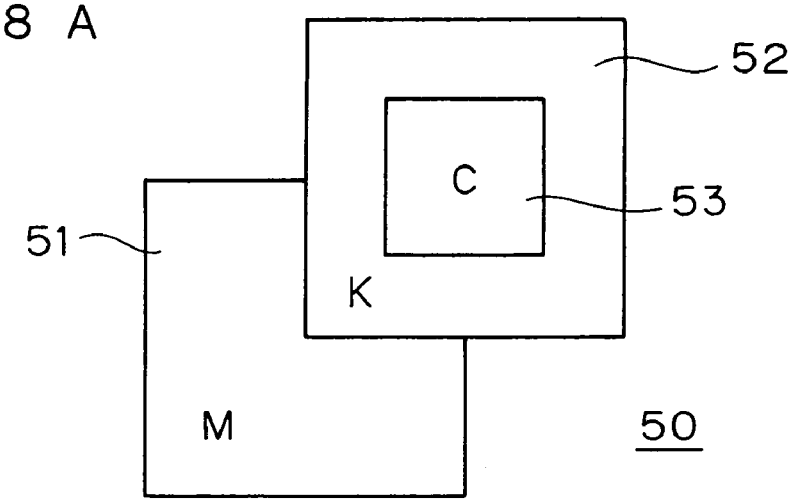
FIGS. 8A, 8B, and 8C are diagrams showing one example of extracting an adjacent vector when an upper related figure is present in an objective figure.
Figure 8B:
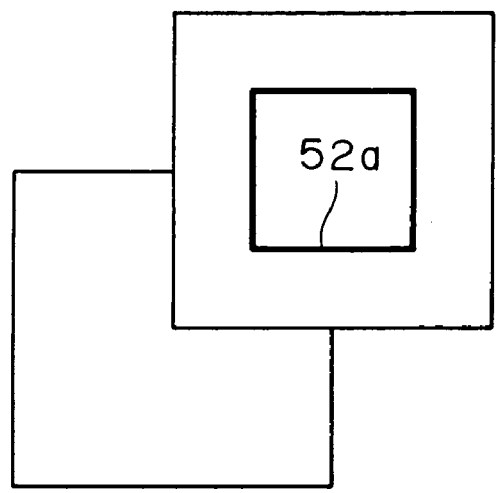
Figure 8C:
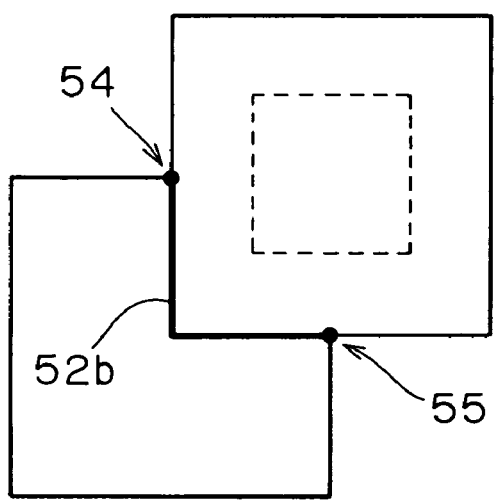

An extracting procedure of adjacent vectors in consideration of an upper related figure will now be described by taking an image 50 shown in FIG. 8A as example. Like the image 100 shown in FIG. 11, the image 50 is one in which a K color annular shape 52 overlaps the upper side of an M color rectangle 51, and on a further upper side than that, a C color rectangle 53 is allocated so as to contact with the inside edge of the annular shape 52. When the annular shape 52 is taken as an objective figure in the image 50, the rectangle 51 is the lower related figure, and the rectangle 53 is the upper related figure. In this case, an adjacent vector between the annular shape 52 and the rectangle 53 is specified first. As a result, an inside edge portion (indicated by the thick line in FIG. 8B) 52a of the annular shape 52 is the adjacent vector with the rectangle 53. Then, an adjacent vector with the rectangle 51 is extracted with the use of the contour of the annular shape 52 except for the inside edge portion 52a. That is, a portion (indicated by the thick line in FIG. 8C) 52b, which is the contour of the rectangle 52 except for the inside edge portion 52a, and extends inwardly from intersections 54 and 55 in the contour of rectangle 51, is extracted and defined as the adjacent vector with the rectangle 51.

This enables to extract, as an adjacent vector, only the portion at which the color of an objective figure and the color of a lower related figure are adjacent each other in appearance, even when an upper related figure is present with respect to the objective figure. That is, it becomes possible not to extract any adjacent vector in the position at which the color of the lower related figure should be hidden by the upper related figure in appearance. Accordingly, also in the subsequent step S5, there is no possibility that a trap figure containing the color component of a lower related figure occurs at such a position, and trapping process is executable without generating any unwanted color component on the image.

Figure 9A:
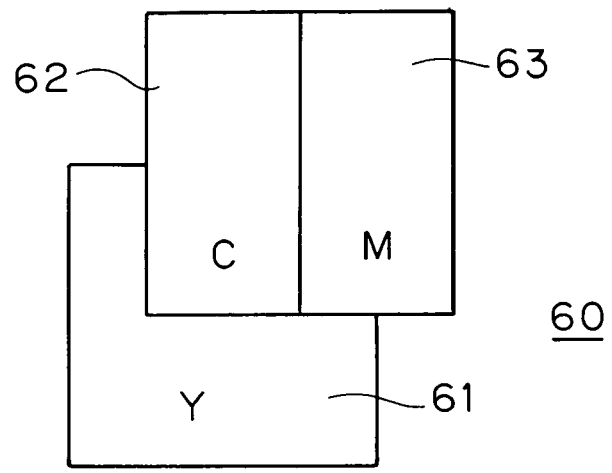
FIGS. 9A, 9B, and 9C are diagrams showing other example of extracting an adjacent vector when an upper related figure is present in an objective figure.
Figure 9B:
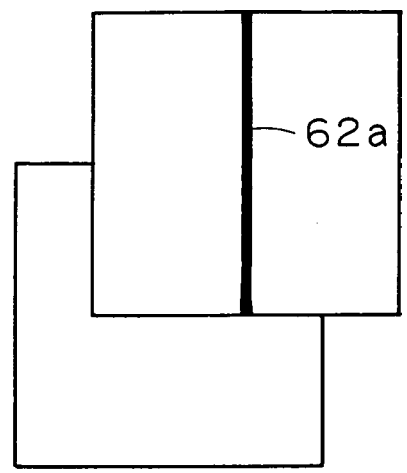
Figure 9C:
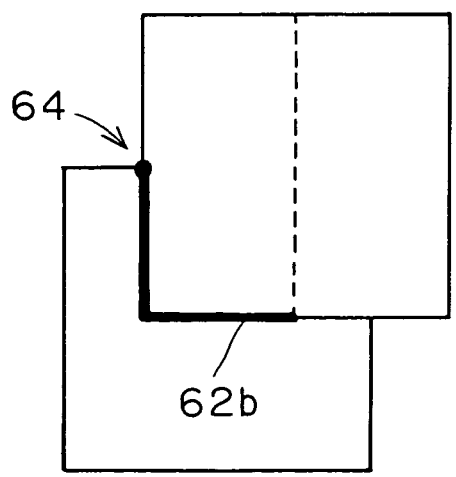
Figure 10A:
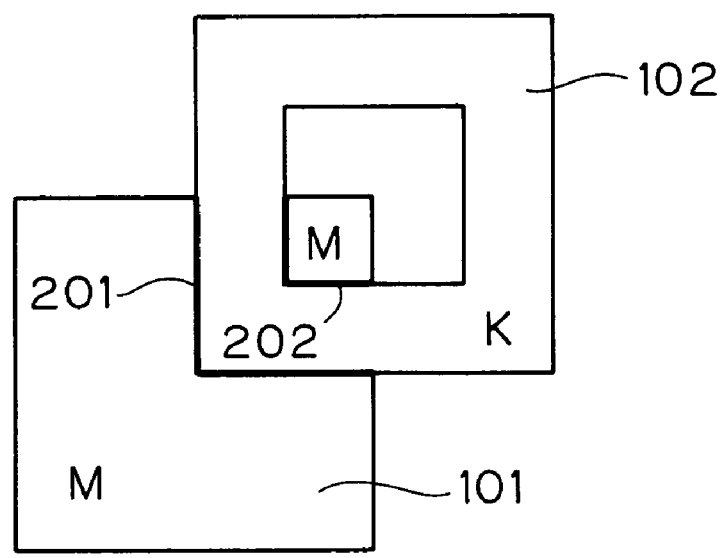
FIGS. 10A and 10B are diagrams showing one example of images configured by allocating a plurality of figures to upper and lower positions.
Figure 10B:
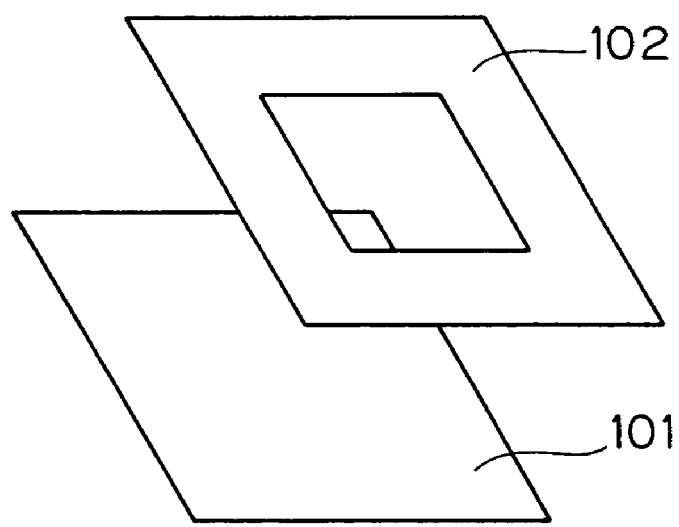

While FIG. 8 shows the case where the objective figure is an annular shape and the upper related figure is allocated so as to contact with the inside edge of the objective figure, without limiting to such an allocation, the present invention is also applicable to general cases where an upper related figure is present with respect to an objective figure. For example, the present invention is effective for the case, as in the image 60 shown in FIG. 9, in which the rectangle 62 is allocated to the upper side of the rectangle 61 and the rectangle 63 is allocated to the uppermost position so as to be adjacent to the rectangle 62. In the image 60, when the rectangle 62 is an objective figure, the rectangle 61 is the lower related figure and the rectangle 63 is the upper related figure. In this case, a segment (a portion indicated by the thick line in FIG. 9B) 62a is specified first, which becomes an adjacent vector with the rectangle 63 that is the upper related figure. Then, a portion (indicated by the thick line in FIG. 9C) 62b, which is the contour of the rectangle 62 except for the segment 62a, and extends inwardly from an intersection 64 in the contour of rectangle 61, is extracted and defined as an adjacent vector with the rectangle 61. Also in this case, the portion 62a at which the color of the rectangle 62 and the color of the rectangle 63 are adjacent each other is excluded from the adjacent vector 62b with the rectangle 61.

In cases where a plurality of upper related figures are present with respect to one objective figure, adjacent vectors with all the upper related figures are specified. Then, the adjacent vectors with the lower related figures are extracted with the use of the contour of the objective figure except for all the portions specified as the adjacent vectors with the upper related figures (i.e., the portions making contact with any one of the plurality of upper related figures). At this time, the adjacent vector between the objective figure and a figure allocated to a relatively lower position in the plurality of upper related figures is specified first and other upper related figures follow in ascending order of position. Then, with the use of the contour of the objective figure except for the portion already extracted as an adjacent vector, an adjacent vector with a figure allocated to a relatively upper position is specified. This enables to specify the adjacent vectors with all the upper related figures, without overlapping.

In step S4, the adjacent vectors between one objective figure and all lower related figures are extracted in the above-mentioned method. Then, such extracting process of adjacent vectors is executed when all the figures constituting the image are taken as an objective figure. As a result, for example, as shown in FIG. 5, the information of the adjacent vectors is stored in the related cells of the respective lower related figures. In the subsequent step S5, a trap figure is created with the adjacent vectors stored here as a skeleton.

<5. Creation of Trap Figure>

Step S5 is to create a trap figure by assigning a direction, a color, a width and the like based on the trap attribute set in step S3, to the adjacent vectors extracted in step S4. The created trap figure is then allocated. This process is executed to all the related cells by referring to the adjacent vectors and the trap attribute stored in the above-mentioned related cell.

Thus, the sequence of trapping process is completed. The image obtained after trapping process is outputted from the computer 91 shown in FIG. 1, as data described in a format such as PS, PDF, or the like. This data is then sent via the network 92 to the raster image processor (RIP) 93 and subjected to RIP process. Thereafter, the image obtained after RIP process is sent to the image setter 94 and the printer 95, and then subjected to the subsequent image output processing.

Thus, as described above, the trapping process in accordance with the present invention enables to allocate a trap figure only to the portion at which the color of an objective figure and the color of a lower related figure are adjacent each other in appearance. Therefore, the trapping process is executable without generating any unwanted color component on the image.

While the invention has been shown and described in detail, the foregoing description is in all aspects illustrative and not restrictive. It is therefore understood that numerous modifications and variations can be devised without departing from the scope of the invention.

What is claimed is:

1. A trapping method for allocating in an image, which is configured by allocating a plurality of figures having a relative upper and lower position order, a boundary figure to a boundary portion at which two different colors contained respectively in said plurality of figures are adjacent each other, comprising the steps of:
   (a) specifying, in a contour of an objective figure included in said plurality of figures, a first portion making contact with a figure allocated to an upper position than said objective figure; and
   (b) extracting, as a skeleton of said boundary figure, a second portion making contact with a figure allocated to a lower position than said objective figure in said contour of said objective figure except for said first portion.

2. The trapping method according to claim 1 wherein
said first portion is a portion making contact with any one of a plurality of figures allocated to an upper position than said objective figure in said contour of said objective figure.

3. The trapping method according to claim 2 wherein
in said step (a), said first portion is specified in such a manner that a portion making contact with a figure allocated to a relatively lower position in said plurality of figures allocated to an upper position than said objective figure is specified first and other figures follow in ascending order of position.

4. The trapping method according to claim 3 wherein
in said step (b), said second portion is specified in such a manner that a portion making contact with a figure allocated to a relatively upper position in a plurality of figures allocated to a lower position than said objective figure is specified first and other figures follow in descending order of position.

5. The trapping method according to claim 4, further comprising the steps of:
(c) selecting a lower related figure that is a figure allocated to a lower position than said objective figure and has a boundary portion with said objective figure;
(d) setting an attribute of said boundary figure that should be allocated between said objective figure and said lower related figure; and
(e) creating said boundary figure by assigning said attribute to said second portion.

6. The trapping method according to claim 5 wherein
said steps (a) to (e) are executed, while selecting in sequence a plurality of figures constituting said image, as said objective figure.

7. A trapping apparatus for allocating in an image, which is configured by allocating a plurality of figures having a relative upper and lower position order, a boundary figure to a boundary portion at which two different colors contained respectively in said plurality of figures are adjacent each other, comprising:
(a) a specifying part to specify, in a contour of an objective figure included in said plurality of figures, a first portion making contact with a figure allocated to an upper position than said objective figure; and
(b) an extracting part to extract, as a skeleton of said boundary figure, a second portion making contact with a figure allocated to a lower position than said objective figure, in said contour of said objective figure except for said first portion.

8. The trapping apparatus according to claim 7 wherein
said first portion is a portion making contact with any one of a plurality of figures allocated to an upper position than said objective figure, in said contour of said objective figure.

9. The trapping apparatus according to claim 8 wherein
said specifying part specifies said first portion in such a manner that a portion making contact with a figure allocated to a relatively lower position in a plurality of figures allocated to an upper position than said objective figure is specified first and other figures follow in ascending order of position.

10. The trapping apparatus according to claim 9 wherein
said extracting part specifies said second portion in such a manner that a portion making contact with a figure allocated to a relatively upper position in a plurality of figures allocated to a lower position than said objective figure is specified first and other figures follow in descending order of position.

11. The trapping apparatus according to claim 10, further comprising:
a selecting part to select a lower related figure that is a figure allocated to a lower position than said objective figure and has a boundary portion with said objective figure;
a setting part to set an attribute of said boundary figure that should be allocated between said objective figure and said lower related figure; and
a creating part to create said boundary figure by assigning said attribute to said second portion.

12. The trapping apparatus according to claim 11, further comprising:
a storage part to store said second portion, said lower related figure and said attribute.

13. The trapping apparatus according to claim 12 wherein
said storage part stores said attribute and said second portion per said lower related figure.

14. A computer-readable storage medium containing a program, which, when executed by a computer, causes the computer to execute processing comprising:
allocating in an image, which is configured by allocating a plurality of figures having a relative upper and lower position order, a boundary figure to a boundary portion at which two different colors contained respectively in said plurality of figures are adjacent each other, comprising the steps of:
(a) specifying, in a contour of an objective figure included in said plurality of figures, a first portion making contact with a figure allocated to an upper position than said objective figure; and
(b) extracting, as a skeleton of said boundary figure, a second portion making contact with a figure allocated to a lower position than said objective figure, in said contour of said objective figure except for said first portion.

15. A printing system comprising:
a computer to execute processing of allocating in an image, which is configured by allocating a plurality of figures having a relative upper and lower position order, a boundary figure to a boundary portion at which two different colors contained respectively in said plurality of figures are adjacent each other; and
an outputting part to output an image after subjected to said processing by said computer,
wherein under a predetermined program, said computer executes the steps of:
(a) specifying, in a contour of an objective figure included in said plurality of figures, a first portion making contact with a figure allocated to an upper position than said objective figure; and
(b) extracting, as a skeleton of said boundary figure, a second portion making contact with a figure allocated to a lower position than said objective figure, in said contour of said objective figure except for said first portion.

* * * * *